United States Patent [19]
Mueller et al.

[11] Patent Number: 5,429,375
[45] Date of Patent: Jul. 4, 1995

[54] FLUID ACTUATED CHUCK WITH LOCK-UP FINGERS FOR ECCENTRIC WORKPIECE WALLS

[75] Inventors: Gerald E. Mueller, Frankenmuth; Gene B. Slachta, Saginaw, both of Mich.

[73] Assignee: General Manufacturing Systems, Inc., Saginaw, Mich.

[21] Appl. No.: 203,421

[22] Filed: Mar. 1, 1994

[51] Int. Cl.⁶ .................. B23B 31/20; B23B 31/40
[52] U.S. Cl. .................. 279/2.02; 279/2.03; 279/2.07; 279/132; 279/133
[58] Field of Search .................. 279/2.02, 2.03, 2.07, 279/2.08, 4.03, 4.07, 4.09, 132, 133, 137

[56] References Cited

U.S. PATENT DOCUMENTS

| | | |
|---|---|---|
| 2,460,577 | 2/1949 | Hohwart et al. |
| 2,509,673 | 5/1950 | Church |
| 2,565,430 | 8/1951 | Hohwart et al. |
| 2,873,121 | 2/1959 | Hahn |
| 3,542,354 | 11/1970 | Fitzpatrick |
| 3,770,287 | 11/1973 | Weber et al. |
| 4,139,207 | 2/1979 | Grimes |
| 4,300,780 | 11/1981 | Urbanic ............... 279/132 |
| 4,448,216 | 11/1984 | Anegawa ............ 279/132 |
| 4,953,877 | 9/1990 | Slachta et al. |

Primary Examiner—Steven C. Bishop
Attorney, Agent, or Firm—Learman & McCulloch

[57] ABSTRACT

Workpiece chucking apparatus includes a chuck body mounting a first plurality of lock-up fingers and a second plurality of gripping fingers. The lock-up fingers are individually biased radially outward into engagement with a peripheral wall of a workpiece to initially support the workpiece in a predetermined position irrespective of the eccentricity of the peripheral wall with respect to other portions of the workpiece which are first located concentrically with the chuck axis. An inflatable bladder flexes the remaining gripping fingers into gripping engagement with the peripheral wall to further radially support the wall in preparation for machining, without disturbing the prepositioning of the workpiece.

17 Claims, 5 Drawing Sheets

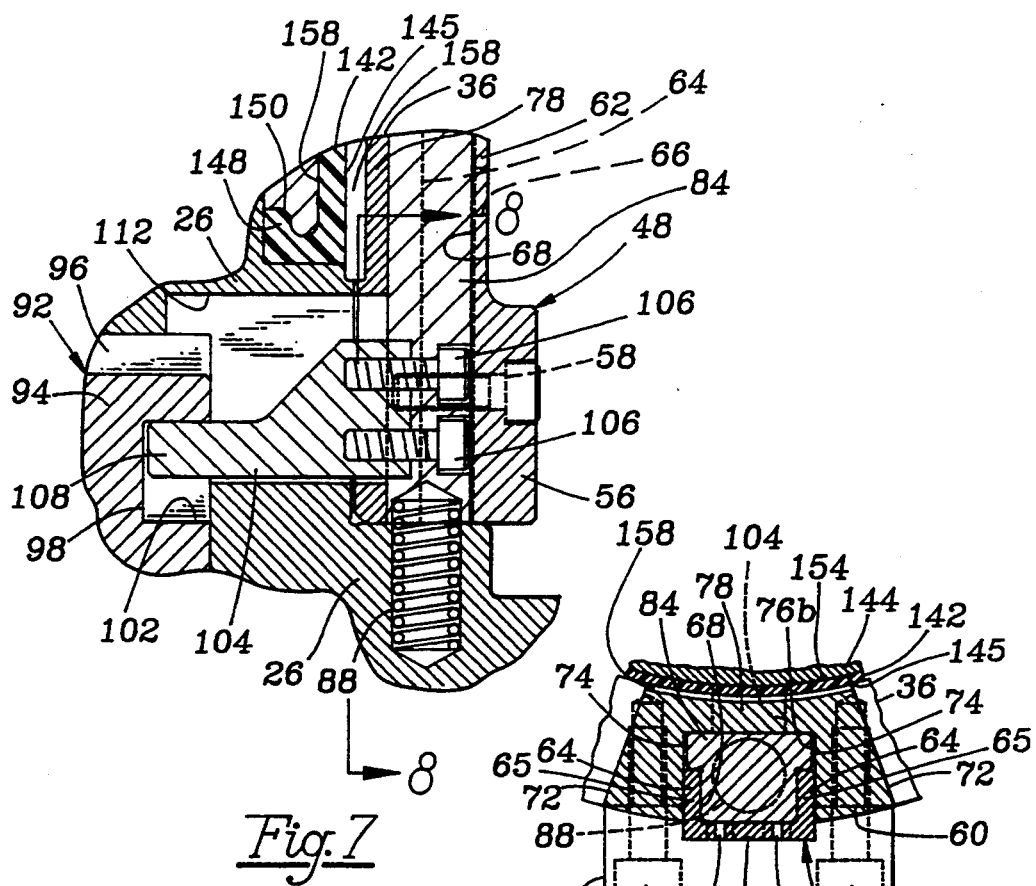
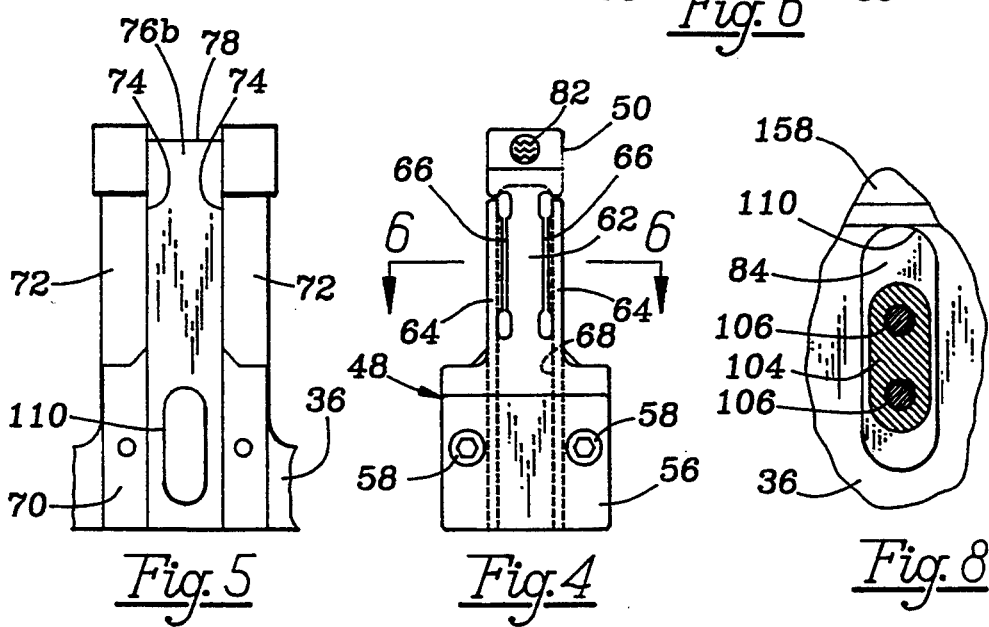

FLUID ACTUATED CHUCK WITH LOCK-UP FINGERS FOR ECCENTRIC WORKPIECE WALLS

This invention relates to fluid actuated chucks for clamping and holding thin, easily distortable, hollow work pieces for machining purposes.

BACKGROUND OF THE INVENTION

Hollow workpieces having a thin walled cylindrical or tubular wall surface to be machined are easily distortable, and may be out of round and out of concentricity in their as-formed condition, prior to machining. A chuck has been developed for holding and gripping such workpieces to enable the circumference of the peripheral wall to be machined to an in-round and concentricity condition. Such a chuck is disclosed in the present assignee's U.S. Pat. No. 4,953,877 to Slachta et al, granted Sep. 4, 1990, and employs a plurality of discrete flexible chucking fingers actuated by a pliable inflatable ring for radially deflecting the fingers conjointly into engagement with the peripheral wall of the workpiece. With some workpieces, where the workpiece includes a rigid hub wall which is centered with respect to the machine spindle, it has been found necessary to grip a non-concentric wall of the part eccentrically, and a chuck of the type disclosed in the patent has been improved to achieve the result desired.

By way of example, for internal chucking applications, a workpiece may have a central, cylindrical, pre-machined rigid hub portion to which a thin, readily distortable stamped metal portion having a non-concentric outer peripheral wall to be gripped and machined is secured. It is necessary that the hub of the workpiece be centered in the chucking apparatus irrespective of the relative eccentricity of the wall of the stamped peripheral portion which is gripped. This assures that the wall of the stamped portion of the workpiece, even though it is gripped eccentrically, is machined concentrically with the pre-machined hub portion. The chuck may be used to grip the part in the same way when it is desired to machine the hub.

SUMMARY OF INVENTION AND ADVANTAGES

Chuck apparatus for holding and gripping a peripheral wall of a thin, easily distortable workpiece comprises a chuck body having workpiece support means for supporting the workpiece in a predetermined position relative to the axis of the chuck body. At least a trio of circumferentially spaced discrete flexible lock-up fingers are secured at one end to the chuck body and extend generally axially of the chuck body to opposite respective free ends thereof. A plurality of circumferentially spaced flexible gripping fingers, separate from the lock-up fingers, are also each secured at one end to the chuck body and extend generally axially of the chuck body to opposite respective free ends thereof. Two stage actuation mechanism or elements are provided for initially deflecting the free ends of the lock-up fingers radially of the chuck body axis independently of one another into releasable engagement with the peripheral wall of the workpiece for holding the workpiece in the predetermined position, and for then sequentially deflecting the free ends of the gripping fingers radially of the chuck body axis into non-distorting gripping engagement with the peripheral wall of the workpiece while it is being held in position by the lock-up fingers.

The independent movement of the lock-up fingers enables them to be deflected individually into engagement with the peripheral wall of the workpiece without distorting the peripheral wall or causing the workpiece to shift radially on the chuck body, enabling the workpiece to be locked and held in the predetermined position. The gripping fingers can then be actuated to further engage and support the peripheral wall in the predetermined position without causing shifting or distortion of the workpiece. The apparatus is particularly advantageous when clamping workpieces for secondary machining operations wherein a portion of the workpiece has been previously machined and must be precisely held on center with the chuck body axis irrespective of the eccentricity of the peripheral wall being gripped and held by the chuck apparatus. Thus, workpieces that have a pre-machined portion or a portion that must be accurately located with respect to the axis of the chuck apparatus may be held and gripped by the chuck apparatus of this invention without distorting the thin peripheral wall of the workpiece or disturbing the predetermined orientation of the workpiece, even though the axis of the easily distortable peripheral wall portion to be gripped is offset eccentrically with respect to the axis of the pre-machined portion of the workpiece.

Other objects and advantages of the invention will become apparent with reference to the accompanying drawings and the accompanying descriptive matter.

THE DRAWINGS

In the drawings,

FIG. 4 is a front elevational view of a lock-up finger;

FIG. 5 is a fragmentary front elevational view of a portion of the chucking module showing the way or slot for slidably accommodating the lock-up finger and its associated cam slide;

FIG. 6 is a sectional plan view of the lock-up finger of FIG. 4, taken along the line 6—6 of FIG. 4 and showing it mounted in position in the chucking module;

FIG. 7 is an enlarged fragmentary sectional transverse view of a lock up finger and cam slide;

FIG. 8 is a fragmentary, elevational view taken along the line 8—8 of FIG. 7;

DETAILED DESCRIPTION OF THE PREFERRED EMBODIMENT

Figure 1:
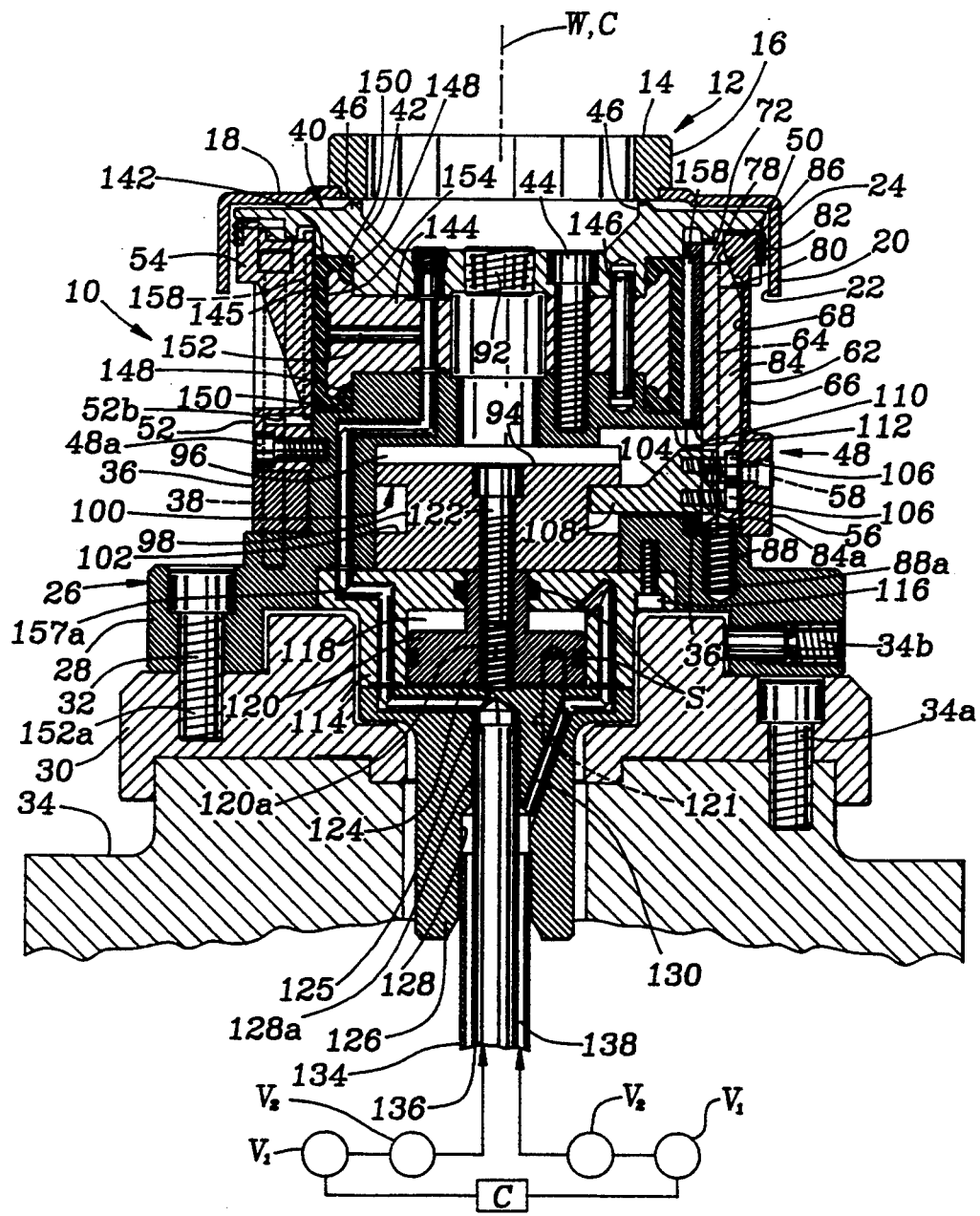
FIG. 1 is a sectional front elevational view of a workpiece supporting chuck constructed in accordance with the present invention, the gripping elements of the chuck being shown in a disengaged position.

A fluid actuated chuck apparatus, constructed according to a presently preferred embodiment of the invention, is designated generally by the reference numeral 10, and is illustrated as adapted for use in holding and gripping a workpiece 12 having a rigid central hub portion 14 which may have one machined surface 16 which is concentric with the workpiece axis W. The workpiece 12 illustrated further includes a thin walled stamping portion 18, which is welded to the hub portion 14, and which has a peripheral wall 20 whose inner surface is to be gripped and held by the chuck 10 during a subsequent machining operation to be performed on its outer surface. The peripheral wall 20 of the stamping portion 18 may be out of round and disposed eccentrically with respect to the central axis W of the pre-machined hub portion 14. For example, the wall 20 may be 0.020 inches out of concentricity with hub surface 16. The object of the subsequent machining operation is to machine the outer surface of the peripheral wall 20 so that it has an acceptable surface finish, and is concentric with the central axis W of the pre-machined hub portion 14.

Figure 11:
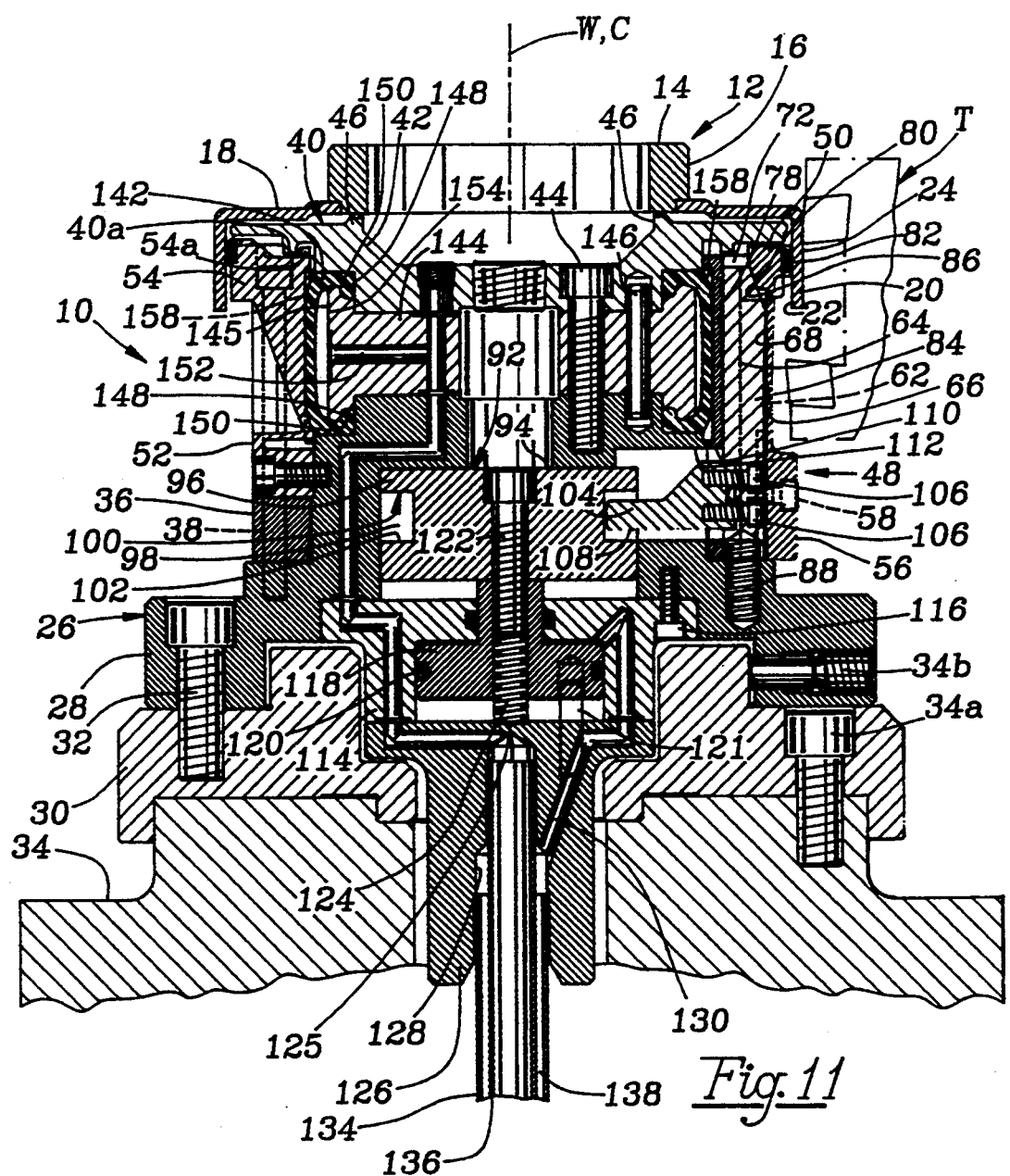
FIG. 11 is a sectional elevational view showing both the lock-up fingers and gripping fingers deflected into gripping engagement with the workpiece.

To accomplish the aforementioned objective, the rotary chuck 10 of the present invention is designed to grip and hold the wall 20 eccentrically and support the peripheral wall 20 for machining by a suitable tool T (FIG. 11) held in a tool holder H, while at the same time assuring that the axis W of the pre-machined central hub portion 14 remains coaxially aligned with the longitudinal chuck axis C of the chuck apparatus 10. It is to be understood that the workpiece is first located so that the axes W and C are coincident and held in this position until wall 20 is gripped.

The chuck 10 includes a chuck body 26 having an annular base portion 28 which may be detachably mounted on an adapter plate 30 by fasteners 32. The plate 30 may be secured to a suitable rotary machine tool spindle 34 by bolts 34a and set bolts 34b. The chuck also includes an annular, generally cylindrical chucking module 36 which may be detachably mounted on the body portion 26 concentrically with the chuck body axis C by fasteners 38.

The chuck body 26 mounts workpiece supporting means, generally designated 40, comprising an upper generally cylindrical end plate portion 42 which may be detachably mounted on the chuck body 26 by fasteners 44. Upstanding arcuate rib portions 46 provide a raised workpiece support platform or stand for supporting the hub portion 14 and workpiece 12. More specifically, the workpiece support means 40 enables the workpiece 12 to be supported on the chuck body 26 prior to actuation of the chuck 10. When supported on the platform 46, the peripheral wall 20 of the workpiece 12 extends downwardly in relation to the platform 46 such that the peripheral wall 20 encircles the chuck body 26 and is spaced radially therefrom as illustrated in FIG. 1. An external locating device (not shown) may be used to position the workpiece 12 in a predetermined position such that the pre-machined hub portion 14 is centered on the chuck body axis C, and to retain it until the chuck grips the workpiece.

The chuck 10 mounts a trio of circumferentially spaced, discrete flexible lock-up fingers 48, preferably fabricated of steel, which are secured at one end thereof to the chuck body 26. The fingers 48 extend upwardly generally axially of the chuck body 26 to opposite respective free ends 50 thereof, and have flexibility-providing resilient leaf or reed sections 62 intermediate their ends. A plurality of circumferentially spaced, discrete, flexible gripping fingers 52, also fabricated of steel, and which are separate and distinct from the lock-up fingers 48, are each also secured at one end thereof to the chuck body 26, as by bolts 48a, and extend upwardly generally axially of the chuck body 26 to opposite respective free ends 54 thereof. The fingers 52 have flexibility-providing reed sections 52b adjacent their lower ends as shown in FIG. 1. Preferably, a plurality, of gripping fingers 52 are provided between each laterally adjacent pair of lock-up fingers 48.

Two stage actuation mechanism or means is provided for initially deflecting the free ends 50 of the lock-up fingers 48 radially of the chuck body axis C independently of one another into releasable engagement with the inner chucking surface 22 of the peripheral wall 20 of the workpiece 12, for engaging and holding the workpiece 12 in the predetermined lock up position prior to its being gripped by the gripping fingers 52. The two stage actuation mechanism then sequentially deflects the free ends 54 of the gripping fingers 52 radially of the chuck body axis C toward and into releasable non-distorting engagement with the inner chucking surface 22, while it is being held in position by the lock-up fingers 48, for further radially supporting the peripheral wall 20 of the workpiece 12 during machining. Provided to limit deflection of the fingers 54 so that excessive travel does not occur, are finger stop or catch projections 54a (FIG. 11) which will engage the dependent flange 40a (FIG. 11) provided on work support member 40.

The two stage actuation accommodates any eccentricity of the peripheral wall 20 relative to the central axis W by first actuating the lock-up fingers 48, enabling them to move independently of one another into engagement with the inner chucking surface 22 of the workpart while the workpiece 12 is temporarily held in the predetermined position by the external workpart locating device (not shown). The independent movement of the lock-up fingers 48 enables the individual fingers to deflect outwardly by whatever amount is necessary to engage the portion of the inner chucking surface 22 which is radially adjacent each lock-up finger 48. Some lock-up fingers may have to be deflected more or less than others in order to contact the chucking surface 22. Once the workpiece 12 is engaged by the free ends 50 of the lock-up fingers 48, it is locked in the predetermined position with the central axis W of the workpiece 12 aligned with the chuck body axis C, irrespective of any eccentricity of the peripheral wall 20. The external locating device (not shown) may then be removed.

Figure 2:
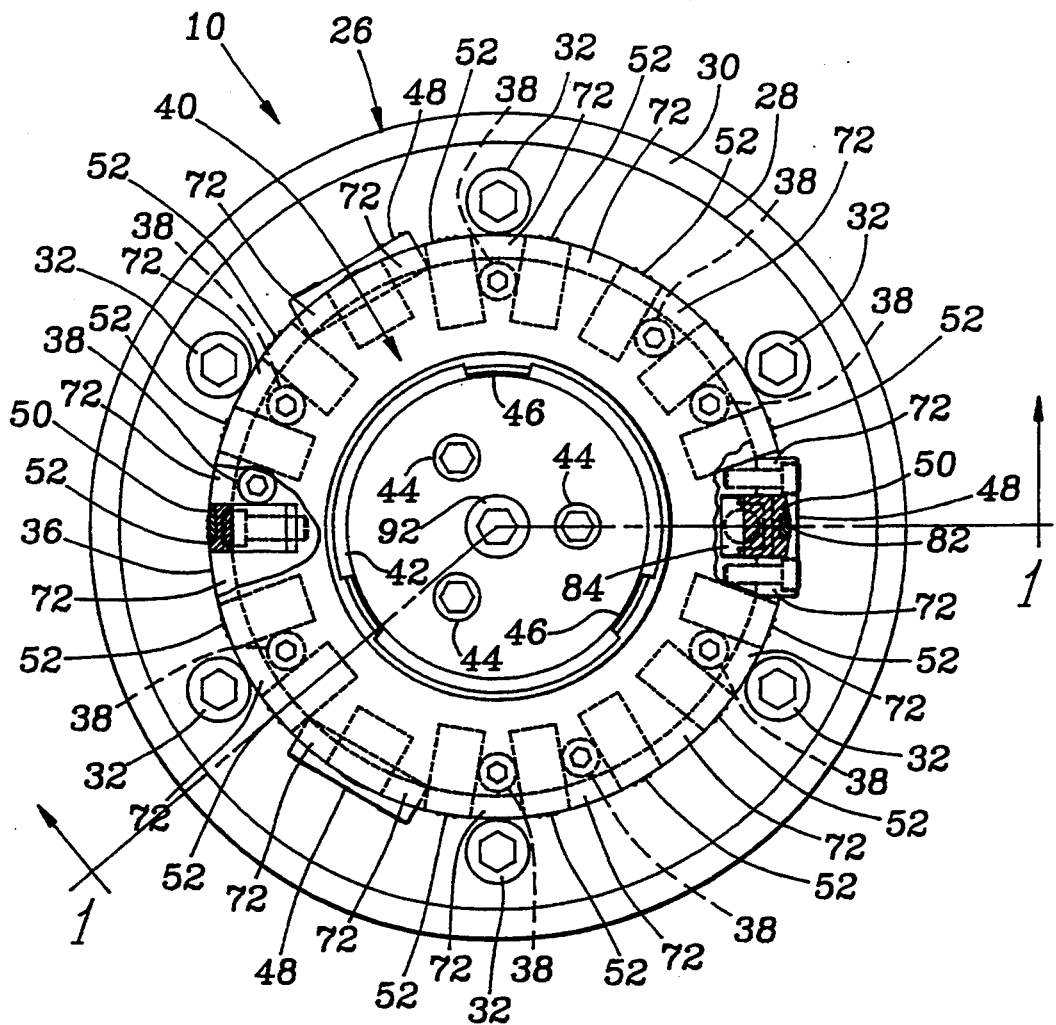
FIG. 2 is a top plan view of the chuck only, with portions partially broken away to show a lock-up finger and a gripping finger.
Figure 3:
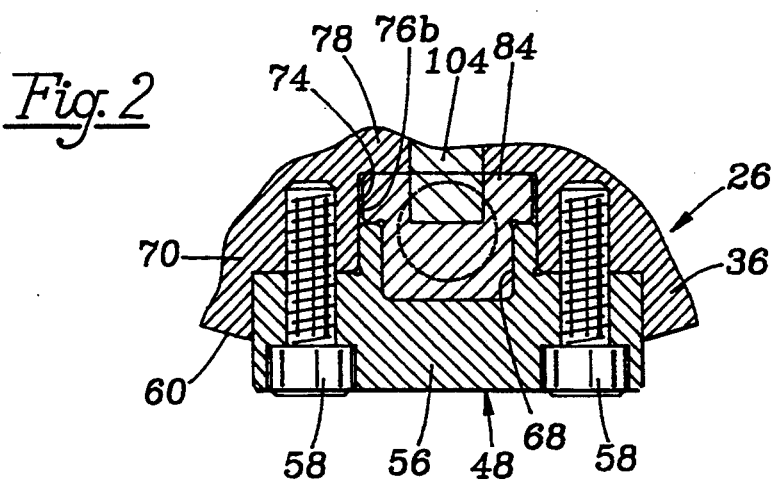
FIG. 3 is an enlarged fragmentary, sectional plan view showing a lock-up finger and its associated cam slide.

The construction of the lock-up fingers 48 is illustrated best in FIGS. 4 and 6 and includes a mounting base portion 56. Multiple fasteners 58 may be employed to detachably mount the base portion 56 of each finger 48 on the outer circumference of the annular chucking module 36, as illustrated in FIG. 3, at circumferentially spaced locations. As shown in FIG. 2, a minimum of three such lock-up fingers 48 are secured to the outer circumference 60 (FIG. 3) of the chucking module 36 equidistant from one another so as to be spaced apart approximately 120°. When so attached, the lock-up fingers 48 are fixed against relative axial movement with respect to the chuck body 26.

Each of the lock-up fingers 48 is formed with a flexible, resilient central leaf spring or reed portion 62 extending integrally upwardly from the mounting base portion 56, to its distal free end 50. The relatively thin resilient spring portion 62 is formed by vertically slotting the vertically intermediate front wall portion 64 of fingers 48 as at 66, as shown in FIGS. 4 and 6, and serves as a resilient, flexible reed enabling the free end 50 to be deflected outwardly relative to the mounting base portion 56 into and out of engagement with the chucking surface 22 of the workpiece 12. The spring finger portion 62 normally returns the free end 50 of each lock-up finger 48 radially inwardly to the disengaged position illustrated in FIG. 1, when free to do so. The fingers 48 further are provided with rigid radial flanges 65 functioning as vertical extensions of mounting base portion 56.

Figure 9:
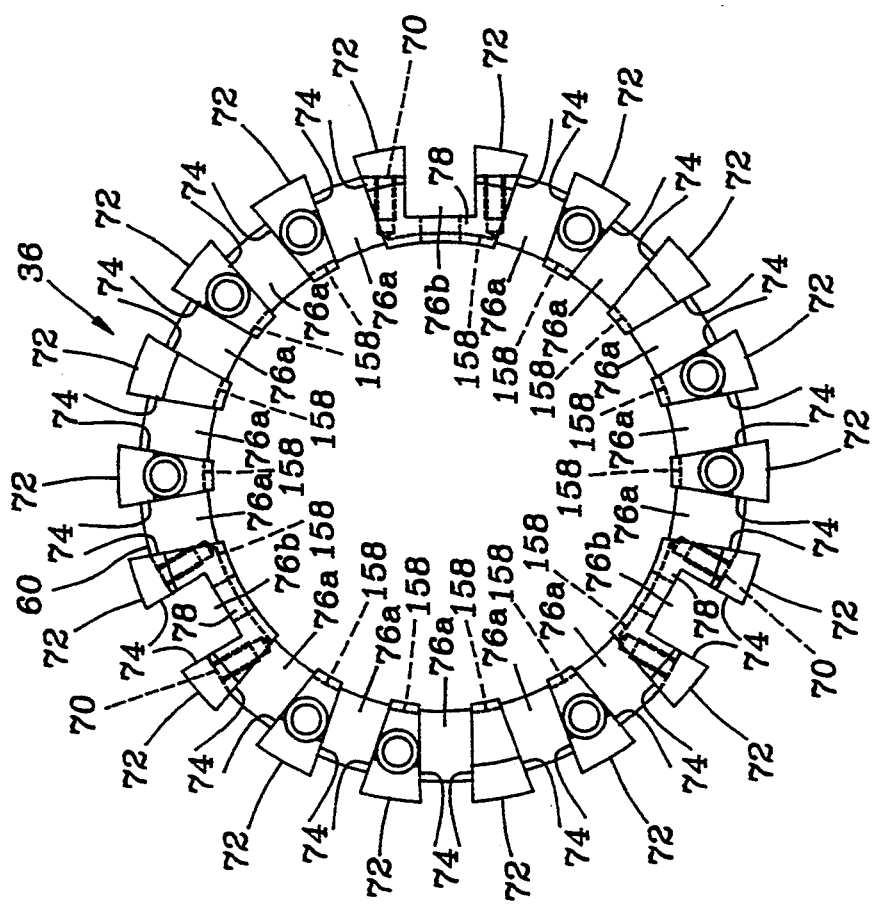
FIG. 9 is a top plan view of the chucking module.

As illustrated best in FIG. 9, the annular chucking module 36, which operatively mounts the fingers 48 and 52, is vertically recessed to provide finger accommodating recesses 76a and 76b for the fingers 52 and 48 respectively. The recesses 76a and 76b are provided between the generally radial side walls 74 of the wall segments 72 which laterally guide the fingers. The recesses 76a are radially open, whereas the recesses 76b (FIGS. 5, 6 and 9) are radially closed at their radially inner ends by rigid transverse walls 78 (FIGS. 5 and 6) to form ways which accommodate cam slides 84.

Figure 10:
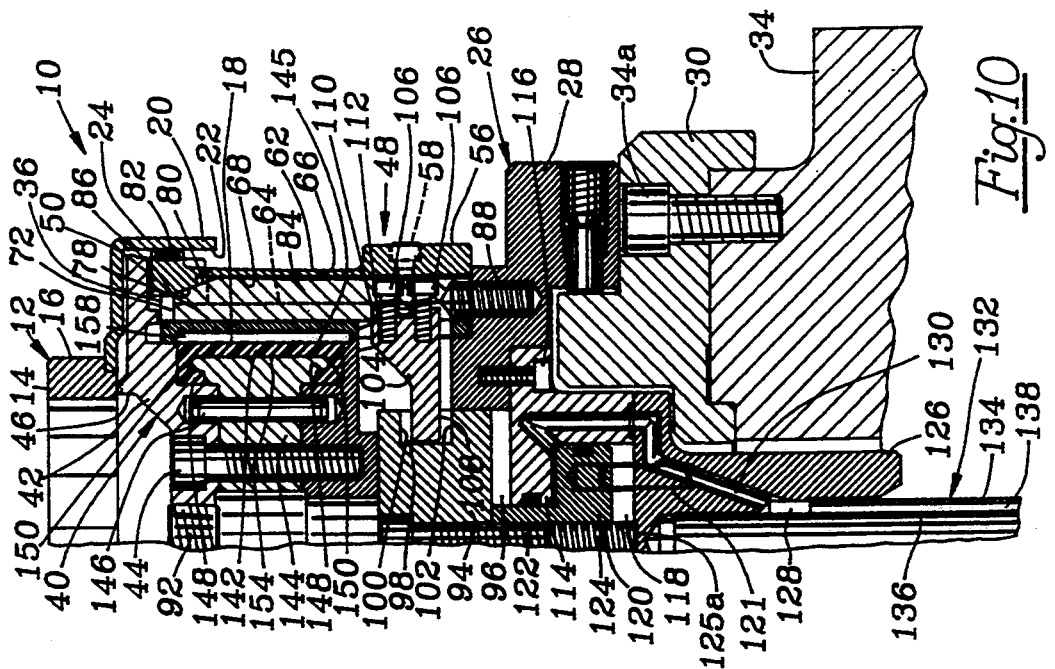
FIG. 10 is a fragmentary sectional elevational view showing the lock-up fingers deflected into gripping engagement with the workpiece in a first stage of actuation of the chuck apparatus.

As shown in FIG. 6, the lateral flange side portions 65 on fingers 48 are received in the openings 76b parallel to and closely adjacent the recessed guide surfaces 68 on cam slides 84, to provide fingers 48 with lateral stability when forces are applied to the lock-up fingers 48 transverse to the direction of deflection. The cam slides 84 are provided in the recesses 76b radially inwardly of fingers 48. The radially inward sides of the ends 50 of the lock-up fingers 48 are provided with camming surfaces 81 (FIG. 10) to cooperate with cam follower surfaces 80 on slides 84. Serrated carbide gripping pads 82 may be bolted, or otherwise secured, to the lock-up fingers 48 and to fingers 54 to facilitate gripping the workpiece wall surface 22 when the fingers 48 and 54 are deflected into engagement with the workpiece 12.

The two stage actuation mechanism for deflecting the lock-up fingers 48 includes the discrete cam slides 84, one for each of the lock-up fingers 48. As shown in FIGS. 1 and 6, the cam slides 84 are slidably supported within the recesses 76b for movement axially parallel to the chuck body axis C. The cam slides 84 are each provided with a camming surface 86 for engagement with the camming surfaces 80 of the lock-up fingers 48.

The mechanism for sliding the cam slides 84 individually toward the free ends 50 of slides 48 comprises a plurality of discrete actuating springs 88, one for each cam slide 84, acting individually between the chuck body 26 and each associated cam slide 84 to constantly bias the cam slides 84 axially upwardly toward camming engagement with the lock-up fingers 48. As illustrated in FIG. 1, the actuating compression coil springs 88 are seated within spring wells 88a provided in the chuck body 26 and extend axially into spring seats 84a provided in the lower ends of the cam slides 84. The cam slides 84 are restrained against radial movement inwardly by the transverse walls 78.

The two stage actuation mechanism also includes mechanism or means for returning the cam slides 84 in an opposite axial direction downwardly away from the free ends 50 of the lock-up fingers 48 and moving the camming surfaces 80, 88 out of camming engagement to permit the lock-up fingers 48 to be returned by their resilient reed portions 62 to disengaged position. A piston-like cam puller or actuator member 94 is accommodated for axial sliding movement within a cylindrical chamber 96 provided in the body portion 26. The member 94 has an annular groove 98 defining axially spaced upper and lower groove walls 100 and 102. Each of the cam slides 84 has a follower leg 104, fixedly secured to it by fasteners 106 or other suitable means, which extends radially inwardly through radial openings 110, 112 provided in the chucking module 110 and body portion 26, respectively, (FIG. 8) into the peripheral groove 98 provided in the cam puller member 94. The legs 104 are of such axial thickness that the member 94 can move axially relative to them.

Beneath member 94, a piston cylinder 114 is received axially between the chuck body portion 26 and the adapter plate 30, and secured in position by fastener bolts 116. The upper surface of the cylinder 114 functions as the bottom wall of the chamber 96. A piston 120 accommodated within the chamber 118 and restrained from rotation by dowel 121, is movable axially therein the same axial distance that member 94 is movable relative to cam slide legs 104.

The piston 120 is detachably secured to the cam puller 94 by fastener bolt 122, or in other suitable manner, so that the piston 120 and cam puller 94 move together within their respective chambers 96 and 118. A compression spring 124, received within a spring well 120a in piston 120 and a spring well 125 in an adaptor fitting 126, reacts between the bolt 122 and the adaptor fitting 126, which provides a lower wall for the chamber 118, and constantly urges the piston 120 and hence the cam slide puller 94 axially upwardly toward the fully raised position illustrated in FIG. 10. Appropriately disposed O-ring seals S are provided for piston 120, as shown. Further, a removable access plug 92 is preferably provided for the workpiece support member 42 as shown.

The inlet adapter 126 has a central fluid inlet passage 128 communicating with the piston cylinder chamber 118 via an auxiliary fluid passage 130 extending from the central inlet 128 upwardly through the piston cylinder 114 and into the upper end of the piston cylinder chamber 118 axially above the piston 120. A dual passage fluid delivery coupling 132 is provided by an outer conduit 134 extending into the central inlet passage 128 and an inner conduit 136 within the outer conduit 134 which extends beyond the central inlet passage 128 up into a reduced upper bore 128a, as illustrated in FIG. 1. The outer surface of the inner conduit 136 is concentrically spaced radially from the inner surface of the outer conduit 134 to define an outer annular fluid delivery passage 138 therebetween.

A source of pressurized actuating fluid (e.g., air under pressure), such as a compressor with a suitable accumulator, operating via a system which may include an on-off valve $V_I$ and a bleed valve $V_2$ for each conduit 134 and 136, may, through suitable passages in the machine tool spindle supply fluid to the conduits 134 and 136 selectively. Actuating fluid under pressure delivered into the passage 138, passes through the auxiliary fluid passage 130, and into the piston cylinder chamber 118 for normally exerting sufficient downward axial pressure on the piston 120 to overcome the biasing force of the springs 124 and 88, thus moving the piston 120 and cam slide puller 94 downwardly to the disengaged position shown in FIG. 1 to pull the cam slides 84 out of camming engagement with the lock-up fingers 48 via the connecting legs 104. Pressure may be relieved from the cylinder 118 via relief valve V-1 enabling the springs 124, 88 to bias the piston 120, cam slide puller 94, and cam slides 84 upwardly to the engaged position shown in FIG. 10.

The two stage actuation mechanism further comprises an inflatable, pliant resilient bladder ring 142, mounted on the chuck body 26 concentrically with the chuck body axis C radially between the chuck body 26 and the gripping fingers 52. A bladder retainer ring 144 supported axially between a top surface of the body portion 28 and the end plate portion 42 may be pinned against rotational movement by dowel pins 146. The bladder 142 is mounted on the outer circumference 145 of the bladder retainer 144 and is of generally C-shaped cross section, with distal ends 148 so received in upper and lower annular slots 150 in the bladder retainer 144 as to provide a fluid-tight seal between the bladder 142 and the bladder retainer 144.

At least one, and preferably a plurality of radial auxiliary fluid passages 152, communicate with the interior of the inner conduit 136, via passages 157a extending through the coupling 126, piston cylinder 114, the body portion 26, and the bladder mount member 144. Passages 152 extend radially to the outer peripheral surface of the bladder retainer 144 to selectively admit fluid under pressure to an inner surface 154 of the bladder ring. The source C will also selectively deliver pressurized actuating fluid to the conduit 136 (e.g. air) and the fluid passages 152 to inflate the bladder to expand radially outwardly and deflect the free ends 54 of the gripping fingers 52 into engagement with the workpiece 12. There are preferably three such auxiliary fluid passages 152 exiting the bladder retainer 144 at 120 degree circumferentially spaced locations.

The gripping fingers 52 may be of the type disclosed in U.S. Pat. No. 4,953,877, which is incorporated herein by reference, if not of the type disclosed herein. Each is shown as supported within one of the slotted openings 76a to provide lateral support restraining twisting via the walls 68 during deflection of the gripping fingers 52. The resilient bladder 142 can radially expand into the recesses 76a and the recesses 158 provided in walls 78, but, the lock-up fingers 48 and associated cam slides 84 are shielded from the bladder 142 by wall surface 78 when the bladder 142 is inflated.

THE OPERATION

Either manually, or under the control of a device such as a programmable controller pressurized actuating fluid (e.g., air) is normally provided to the auxiliary fluid passage 130 via the fluid delivery passage 138 and delivered into the piston cylinder chamber 118 above the piston 120 exerting sufficient downward axial pressure on the piston 120 to overcome the compression springs 88, 120. This forces the piston 120 and cam slide puller 94 downwardly to the bottoms of their respective chambers which, in turn, causes the upper groove wall 100 of the cam slide puller 94 to engage the connecting legs 104 of the cam slides 84 and pull the cam slides 84 axially downwardly out of camming engagement with the lock-up fingers 48. The resilient spring leaf portions 62 of the lock-up fingers 48 are thereby free to self-bias the free ends 50 radially inwardly to the inoperative position shown in FIG. 1.

To initiate a chucking operation, a workpiece 12 is supplied to the raised platform 46 and located by an external locating device (not shown) such that the central axis W of the pre-machined hub portion 14 is aligned coaxially with the central chuck body axis C. While held in the predetermined position by the external locating device (not shown), the fluid pressure is bled from the piston cylinder chamber 118 enabling the compression springs 88 to move the cam slides 84 axially relative to the free ends 50 of the axially restrained lock-up fingers 48 independently of one another, bringing the camming surfaces 86 of cam slides 84 into camming engagement with the respective camming surfaces 80 of the lock-up fingers 48. As slides 84 continue to move upwardly, the free ends 50 are deflected radially outwardly and slightly axially downwardly along an arcuate path from the positions shown in FIG. 1, to the workpiece engaging position shown in FIG. 10, wherein the free ends 50 engage the inner chucking surface 22 of the peripheral wall 20 of the workpiece 12. The arcuate outward movement of the free ends 50 exerts both a radially outward clamping force and an axially downward force pulling the workpiece 12 against the raised platform 46.

The individual sliding movement of the cam slides 84 enables each of the trio of lock-up fingers 48 to deflect outwardly by that amount necessary to engage the adjacent portion of the inner chucking surface 22 without causing radial displacement or movement of the workpiece 12 on the chuck body 26, thereby accommodating any out of roundness or eccentricity of the peripheral wall 20. The wedging of the camming surfaces 80, 86 serves to lock the lock-up fingers 48 in their individual actuated positions until such time as the cam slides 84 are moved out of wedging engagement with the lock-up fingers 48 by repressurizing the piston cylinder chamber 118. The lock-up action provided by the lock-up fingers 48 enables the external locating device to be removed and serves to thereafter hold the workpiece 12 in the predetermined position in preparation for gripping by the gripping fingers 52.

Once the workpiece 12 has been secured in place by actuation of the lock-up fingers 48, pressurized actuating fluid from source C may then be introduced into the auxiliary fluid passages 152 via the inner conduit 136 and against the inner surface 154 of the bladder 142 to thereby inflate and expand the bladder radially outward against the inner radial surfaces of the gripping fingers 52. This causes the free ends 54 of the gripping fingers 52 to be deflected radially outward and slightly axially downward along an arcuate path into gripping engagement with the chucking surface 22 to thereby provide additional radial support for the machining operation to be performed by tool T. Since the cam slides 84 and lock-up fingers 48 are shielded from the bladder 142 by the transverse walls 78, inflation of the ring cannot disturb the positions of the lock-up fingers 48. In this way, the workpiece 12 is firmly gripped and held in the predetermined position without distorting the peripheral wall 20.

To release the workpiece 12, the ring bladder 142 is deflated causing the gripping fingers 52 to self-bias radially inwardly out of engagement with the inner chucking surface 22 of the workpiece, and the piston cylinder chamber 118 is repressurized with actuating fluid drawing the cam slides 84 out of camming engagement with the lock-up fingers 48, allowing them to return to their disengaged condition to free the workpiece 12.

It is to be understood that the embodiments described are exemplary of various forms of the invention only and that the invention is defined in the appended claims which contemplate various modifications within the spirit and scope of the invention. For example, the present chuck may be used as a rotary or stationary chuck and may be adapted to grip external surfaces as well as internal surfaces.

We claim:

1. A chuck for holding and gripping a peripheral wall of a thin, easily distortable workpiece comprising:

a chuck body having workpiece supporting surface for supporting the workpiece in a predetermined position relative to an axis of said chuck body;

a plurality of circumferentially spaced, discrete flexible lock-up fingers each secured at one end to said chuck body and extending generally axially to opposite respective free ends thereof;

a plurality of circumferentially spaced, flexible gripping fingers separate from said lock-up fingers, each gripping finger being secured at one end to said chuck body and extending generally axially of said chuck body to opposite respective free ends thereof; and two stage actuation mechanism mounted by said chuck body in interacting relationship with said lock-up fingers and said gripping fingers for initially deflecting said free ends of said lock-up fingers radially of said chuck body axis independently of one another toward and into releasable engagement with the peripheral wall of the workpiece for holding the workpiece in the predetermined position, and for sequentially deflecting said free ends of said gripping fingers radially of said chuck body axis toward and into releasable nondistorting engagement with the peripheral wall of the workpiece while the wall is held in position by said lock-up fingers for further gripping and radially supporting the workpiece in said predetermined position.

2. The apparatus of claim 1 wherein said two stage actuation mechanism includes an inflatable pliant resilient ring concentrically mounted on said chuck body radially between said chuck body and said gripping fingers, and a fluid supply system connected to said chuck body for inflating said ring with pressurized fluid to expand said ring radially of said chuck body axis against said gripping fingers to thereby move said free ends of said gripping fingers into gripping engagement with said wall of the workpiece, and for deflating said ring to permit said free ends of said gripping fingers to return and release the workpiece.

3. The apparatus of claim 2 wherein said two stage actuation mechanism includes a plurality of discrete cam slides supported by said chuck body radially between said chuck body and said lock-up fingers, each cam slide having a camming portion and each lock-up finger having an associated camming portion, said cam slides being individually slidable axially of said chuck body relative to said lock-up fingers, actuator elements on said chuck body for sliding said cam slides individually in one axial direction bringing said camming portions of the lock-up fingers and cam slides into camming engagement and deflecting said free ends of said lock-up fingers radially of said chuck body axis into said engagement with the workpiece, and slide return mechanism on said chuck body for sliding said cam slides in an opposite axial direction and moving said camming portions out of camming engagement to permit said free ends of said lock-up fingers to return and release the workpiece.

4. The apparatus of claim 3 wherein said actuator elements comprise a plurality of discrete actuating springs associated with said plurality of cam slides and acting individually between said chuck body and each of said cam slides to constantly bias said cam slides individually toward camming engagement with said lock-up fingers.

5. The apparatus of claim 4 wherein said slide return mechanism comprises a cam slide pulling member having a peripheral recess, said cam slides each having a connecting leg extending transversely therefrom radially inwardly into said peripheral recess.

6. The apparatus of claim 5 wherein said cam slide return mechanism includes a piston cylinder secured to said chuck body and a piston accommodated therein which is secured to said cam slide pulling member for imparting axial sliding movement to said pulling member, and fluid delivery supply mechanism for selectively introducing fluid under pressure into said cylinder for forcibly moving said cam slide return member in said opposite axial direction and forcing said cam slides to move in said opposite axial direction in opposition to the biasing force of said springs, and for relieving the fluid pressure in said chamber to enable the biasing force of said springs to move said cam slides in said one axial direction into camming engagement with said lock-up fingers.

7. The apparatus of claim 6 wherein said connecting legs have a predetermined thickness and said peripheral slot has a width that is relatively greater in dimension than the thickness of the connecting legs.

8. The apparatus of claim 2 wherein said chuck body includes shield walls interposed radially between said inflatable ring and said lock-up fingers for shielding said lock-up fingers from engagement by said ring during said radial expansion of said ring.

9. The apparatus of claim 1 wherein said chuck body includes lateral support portions for restraining said lock-up fingers and said gripping fingers laterally during said radial deflection of said fingers.

10. The apparatus of claim 9 wherein said lateral support portions are provided by a plurality of slots circumferentially spaced about said chuck body and extending axially of said chuck body, said lock-up fingers and said gripping fingers being mounted within said slots, and said slots each having laterally spaced, axially extending side walls in sliding engagement with said fingers.

11. The apparatus of claim 1 wherein said gripping fingers are provided circumferentially between said lock-up fingers.

12. The apparatus of claim 1 wherein said lock-up fingers each include a mounting base portion at said one end thereof, a flexible resilient reed portion extending from said mounting base portion longitudinally to said free end of each said lock-up finger, and a pair of rigid lateral side portions secured at one end to said base portion and extending longitudinally therefrom on opposite lateral sides of said reed portion in spaced relation thereto for engaging said chuck body to provide lateral support for said lock-up finger while permitting deflection of said reed portion and said free end.

13. The apparatus of claim 12 wherein said rigid lateral side portions and reed portion form a channel which slideably accommodates an associated cam slide.

14. The apparatus of claim 13 wherein said mounting base portion, said reed portion, and said side portions are integral and said reed portion is formed by a pair of longitudinally extending laterally spaced slots separating said reed portion from said side portions.

15. In a method of operating a workpiece gripping chuck incorporating: a chuck body with a front end and a rear base end adapted to mount on a machine tool; a workpiece support surface for the front end of the chuck body for supporting a workpiece to be machined in a predetermined position; a plurality of circumferentially spaced discrete flexible lockup fingers supported in circumferentially spaced relation concentrically with said chuck body; a plurality of circumferentially spaced radially movable flexible gripping fingers supported concentrically on said chuck body in circumferentially spaced relation and extending generally axially, the gripping fingers being secured at one end to the chuck body and extending axially to opposite respective free ends; an inflatable bladder on said chuck body in generally concentric relationship therewith circumferentially adjacent to said plurality of gripping fingers; and two-stage control mechanism for initially deflecting said free ends of said lockup fingers radially independently of one another toward and into releasable engagement with the workpiece for holding the workpiece in said predetermined position; and for sequentially then deflecting the free ends of the gripping fingers radially of the chuck body toward and into releasable nondistorting engagement with the radial wall of the workpiece, the steps of:

(a) loading a workpiece having a radial wall to be gripped to said workpiece support surface, and locating it in said predetermined position;

(b) operating said control mechanism to first move said lockup fingers radially to engage the radial wall of the workpiece without disturbing its predetermined position; and (c) then inflating said bladder to cause said plurality of gripping fingers to grip the radial wall of the workpiece.

16. The method of claim 15 wherein said workpiece is prelocated in a position in which said radial wall is eccentric to the chuck body.

17. The method of claim 15 wherein said gripping fingers and said lockup fingers are circumferentially interspersed, and said method includes the step of radially shielding the lockup fingers so they are not moved radially upon inflation of the bladder.

* * * * *